United States Patent [19]

Teramachi

[11] Patent Number: 4,551,895

[45] Date of Patent: Nov. 12, 1985

[54] METHOD OF MAKING A LINEAR SLIDE BALL BEARING

[76] Inventor: Hiroshi Teramachi, 34-8, Higashi-Tamagawa 2-chome, Setagaya-ku, Tokyo 158, Japan

[21] Appl. No.: 685,014

[22] Filed: Dec. 21, 1984

Related U.S. Application Data

[62] Division of Ser. No. 541,640, Oct. 13, 1983, Pat. No. 4,527,841.

[51] Int. Cl.$^4$ .......................................... B21D 53/12
[52] U.S. Cl. ................................. 29;148.4 R; 264/242; 264/318; 264/336
[58] Field of Search .......................... 308/6 C, 6 R; 29/148.4 R, 149.5 NM, 149.5 R, 149.5 B; 264/242, 232, 234, 318, 336, 295

[56] References Cited

U.S. PATENT DOCUMENTS

| | | | |
|---|---|---|---|
| 3,625,575 | 12/1971 | Darnell | 308/6 R X |
| 4,290,181 | 9/1981 | Jackson | 264/242 X |
| 4,432,409 | 2/1984 | Steele | 264/248 X |
| 4,433,876 | 2/1984 | Mottate | 308/6 R X |
| 4,475,776 | 10/1984 | Teramachi | 308/6 C |
| 4,489,990 | 12/1984 | Teramachi | 308/6 C |

FOREIGN PATENT DOCUMENTS

| | | | |
|---|---|---|---|
| 146753 | 11/1981 | Japan | 264/318 |
| 24636 | 2/1984 | Japan | 264/296 |

Primary Examiner—Howard N. Goldberg
Assistant Examiner—John T. Burtch
Attorney, Agent, or Firm—Armstrong, Nikaido, Marmelstein & Kubovcik

[57] ABSTRACT

The present invention provides a linear slide ball bearing light in weight and suitable for guiding a high speed reciprocal movement, the linear slide ball bearing comprising a bearing case formed of a molded light weight material such as synthetic resin and aluminum, a pair of bearing races formed of a rigid material and attached to the bearing case, the bearing races being provided with no-load ball guide grooves for forming no-load ball guide holes in cooperation with no-load ball guide grooves on the bearing case side and load ball grooves, a raceway table having a rolling groove at the position corresponding to that of the load ball groove of each bearing race furnished in the bearing case, a pair of side covers fitted to both the left and right sides of the bearing case and provided with guide grooves in the inside surfaces in the circumferential direction for forming endless tracks by making both the ends of the no-load ball guide holes and the load ball grooves communicate with each other, and a number of balls rolling in the endless track for supporting loads between the load ball grooves of each bearing race and the rolling grooves of the raceway table. The present invention also provides a method for the above linear slide ball bearing and provides a linear slide table incorporating the linear slide ball bearing.

2 Claims, 23 Drawing Figures

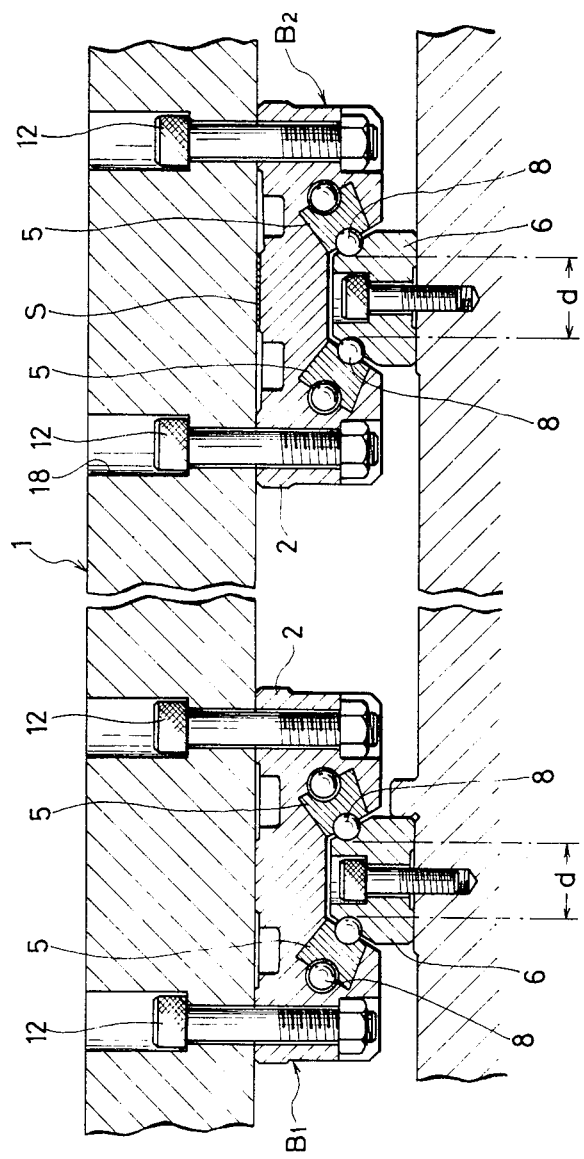

4,551,895

1

METHOD OF MAKING A LINEAR SLIDE BALL BEARING

This is a division of application Ser. No. 541,640, filed Oct. 13, 1983, now U.S. Pat. No. 4,527,841.

BACKGROUND OF THE INVENTION

The present invention relates to a linear slide ball bearing and a production thereof and a linear slide table incorporating the linear slide ball bearings.

In the sliding portions of numerical controlled machine tools and industrial robots, linear slide ball bearings are used to linearly guide the moving machines, tools, apparatus, and so forth.

In such a linear slide ball bearing, it is desirous making short the speed rise-up time during the linear movement in order to increase speed and making small the force of inertia when the movement stops; consequently, the weight of a sliding table must be minimized. However, owing to the fact that high rigidity is required particularly for the portion where a load ball groove is formed in the slide table, consideration can be given to the use of material offering excellent rigidity for the formation of the portion where the load ball groove is provided and of material relatively light in weight for the formation of the remaining portion so as to couple both the portions in one body with a coupling bolt. However, the problem is that reduced productivity will make such a combination costly as screw tapping is needed in this case.

Moreover, because importance is normally attached to the length of life of such a linear slide ball bearing, the bearing when it is fitted in a linear slide table needs pressurizing to a great extent, whereas only minor pressurization should be applied to the bearing used when light sliding is particularly necessary as it is used for a measuring instrument, etc.; in other words, since the efficiency required differs depending on its use and the operating condition, pressurization applicable to the bearing varies in magnitude. For this reason, it will be extremely convenient if varieties of requirements are satisfiable through simple adjusting operation.

SUMMARY OF THE INVENTION

The present invention which has been made in the light of the above described problem relates to improvements in the linear slide ball bearing proposed by the present inventor in the Japanese Patent Application No. 42583, 1982.

An object of the present invention is to provide a linear slide ball bearing light in weight and suitable for guiding a high speed reciprocal movement, the linear slide ball bearing comprising a bearing case formed of a molded light weight material such as synthetic resin and aluminum, a pair of bearing races formed of a rigid material and attached to the bearing case, the bearing races being provided with no-load guide grooves for forming no-load ball guide holes in cooperation with no-load ball guide grooves on the bearing case side and load ball grooves, a raceway table having a transfer groove at the position corresponding to that of the load ball groove of each bearing race furnished in the bearing case, a pair of side covers fitted to both the left and right sides of the bearing case and provided with guide grooves in the inside surfaces in the circumferential direction for forming endless tracks by making both ends of the no-load ball guide holes and the load ball grooves communicate with each other, and a number of balls rolling in the endless track for supporting loads between the load ball grooves of each bearing race and the transfer grooves of the raceway table.

Another object of the present invention is to provide a method for the production of a linear slide ball bearing with bearing races, each capable of being installed in a bearing case without using screws, the method comprising the steps of setting the size and shape of each bearing race roughly the same as those of the preplaced core used when the bearing case has been molded, and engaging the bearing races with each other to fix them by utilizing the curve of the bearing case produced when the preplaced core is pulled out of the molded.

Still another object of the present invention is to provide a linear slide table incorporating the aforementioned ball bearing, wherein pressurization is simply applicable to the ball bearing, so that the linear slide table can be utilized for various purposes.

BRIEF DESCRIPTION OF THE DRAWING

FIG. 23 is a cross-sectional view of an application of the linear slide table shown in FIG. 15.

DESCRIPTION OF THE PREFERRED EMBODIMENTS

Figure 1:
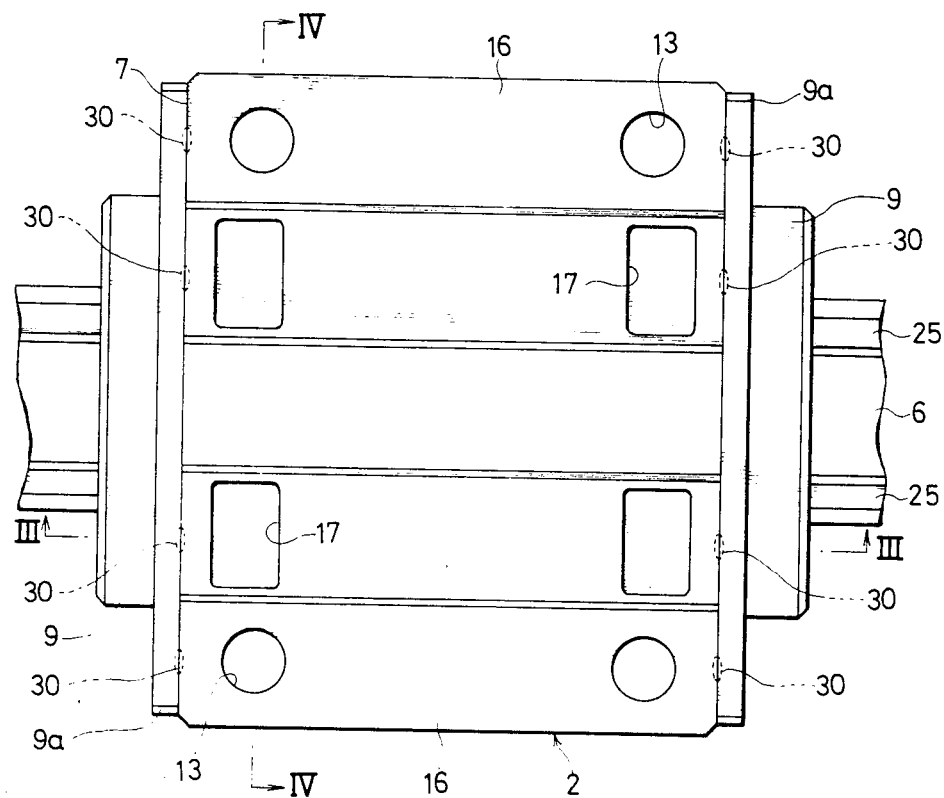
FIG. 1 is a plan view of a linear slide ball bearing as an embodiment of the present invention.
Figure 2:
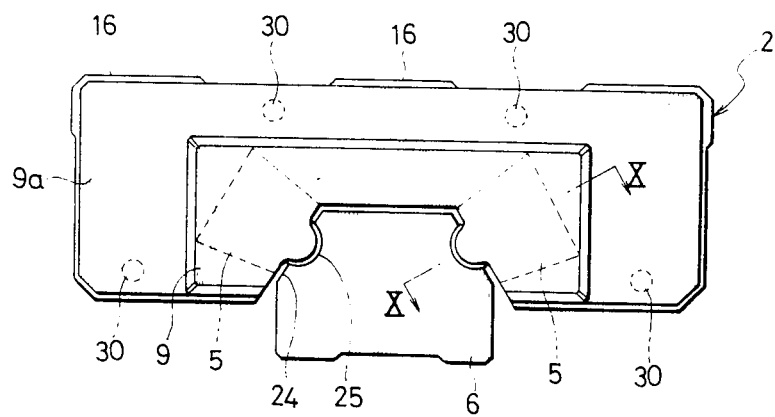
FIG. 2 is a front view of the bearing.

Referring now to the drawings, exemplary embodiments of the present invention will be described.

In FIGS. 1 through 10, there is shown a linear slide ball bearing in connection with one preferred embodiment of the present invention.

This linear slide ball bearing comprises a bearing case 2 to which a fixing table 1 is installed, a pair of bearing races 5, 5 fixed by inserting the races in dovetail recessed grooves 4, 4 in the sleeves 3, 3 of the bearing case 2, a raceway table 6 as a raceway track for linearly guiding the bearing case 2 and side covers 9, 9 installed so as to form part of the endless track of balls 8 on the front and rear end surfaces 7, 7 of the bearing case 2.

Figure 4:
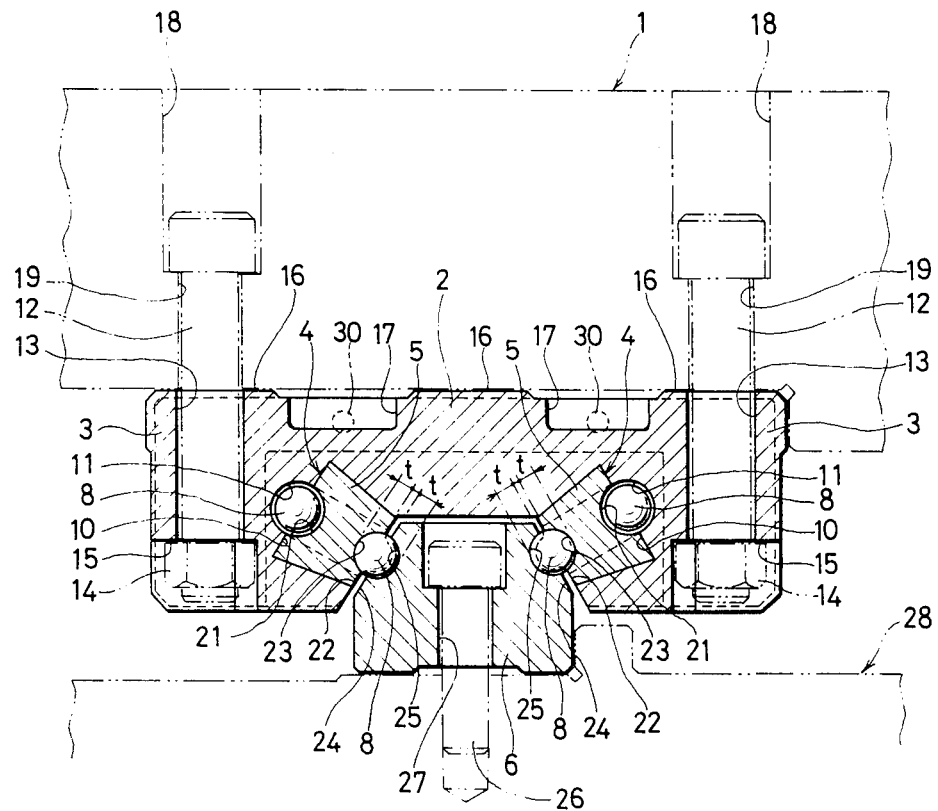
FIG. 4 is a cross-sectional view of what is shown in FIG. 1 along IV—IV line.
Figure 5:
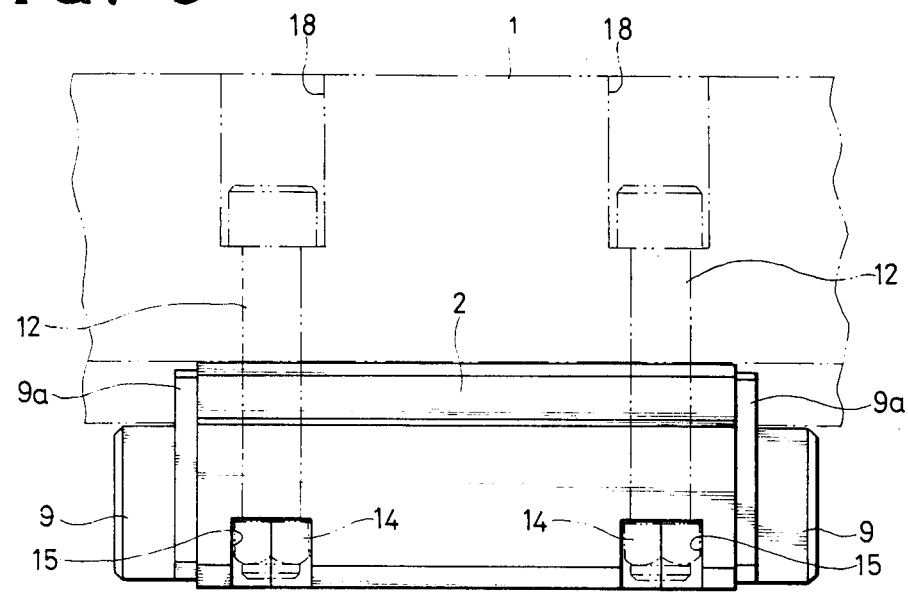
FIG. 5 is a side view of what is shown in FIG. 1.
Figure 6:
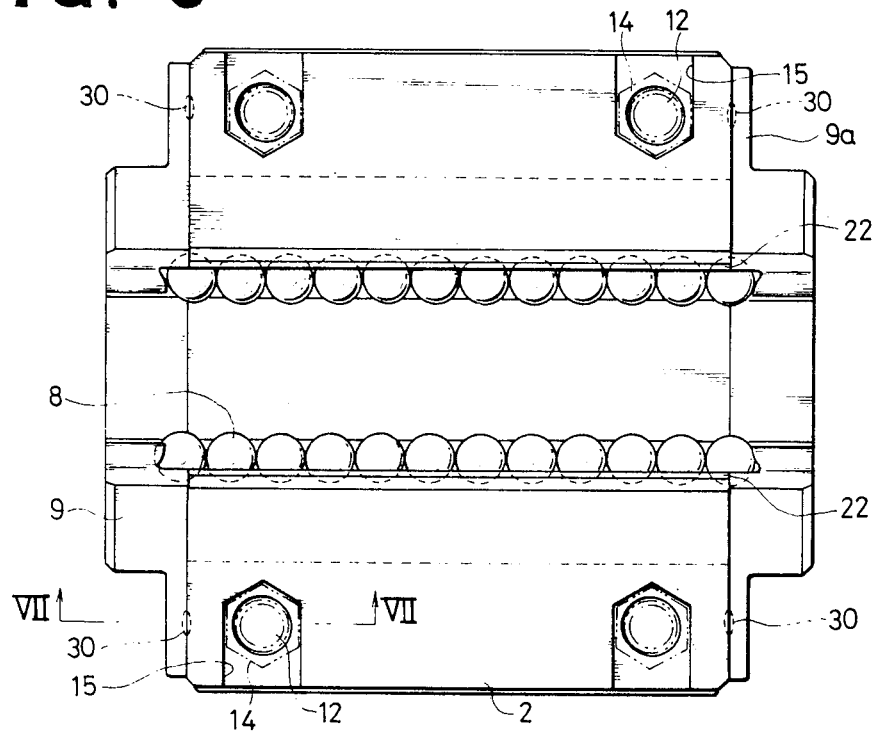
FIG. 6 is a bottom plan view excluding the raceway table.

As shown in FIG. 4, the bearing case 2 is formed into the shape of letter "C" in cross section by a synthetic resin mold, the bearing case having a recess on the under surface side; the recessed grooves 4, 4 formed in both the sleeves 3, 3 and inwardly opened in such a way that bottom walls 10, 10 are wide while openinings are narrow; and no-load ball guide grooves 11, 11 formed in the shape of a roughly semi-circle in cross section in the bottom walls 10, 10 of the recessed grooves 4, 4. In the sleeves 3, 3 of the bearing case 2, there are provided as shown in FIG. 1 through holes 13, 13 for inserting bolts 12, 12 and as shown in FIG. 6 recesses 15, 15 for burying nuts 14, 14 for the bolts 12, 12, respectively and, in addition, tier 16, 16, 16 along the sliding direction in the central and side portions on the upper surface of the bearing case 2, escape holes 17, 17 being also provided close to the front and rear end surfaces 7, 7 of the bearing case 2.

Figure 3:
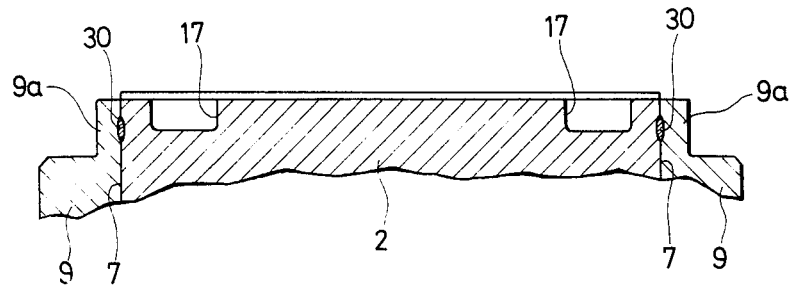
FIG. 3 is a cross-sectional view of what is shown in FIG. 1 along III—III line.
Figure 7:
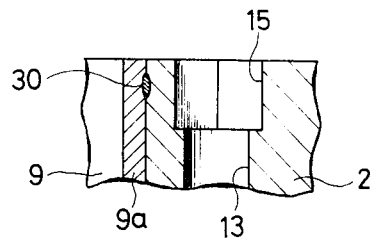
FIG. 7 is a cross-sectional view of what is shown in FIG. 6 along VII—VII line.

The through holes 13, 13 are for inserting the bolts 12, 12 via through holes 18, 18 having a slightly large inside diameter and through holes 19, 19 having a small inside diameter made in a fitting table 1 when the fitting table 1 is installed to the bearing case 2. The recesses 15, 15 and the escape holes 17, 17 are intended, as shown in FIGS. 3 and 7, to allow the bearing case 2 and ribs 9a, 9a of the side covers 9, 9 to be welded by inserting a metal cradle of a plastic welder or a horn when the side covers 9, 9 are installed to the front and rear surfaces 7, 7 of the bearing case 2.

Figure 8:
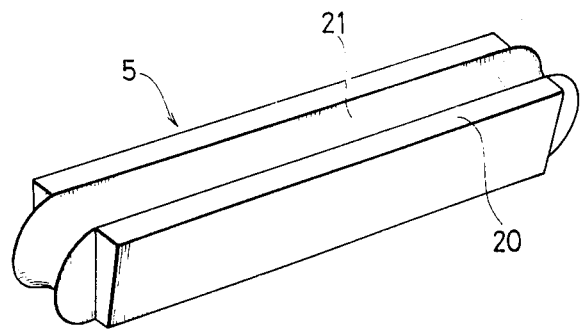
FIG. 8 is a schematic view of a bearing race.
Figure 10:
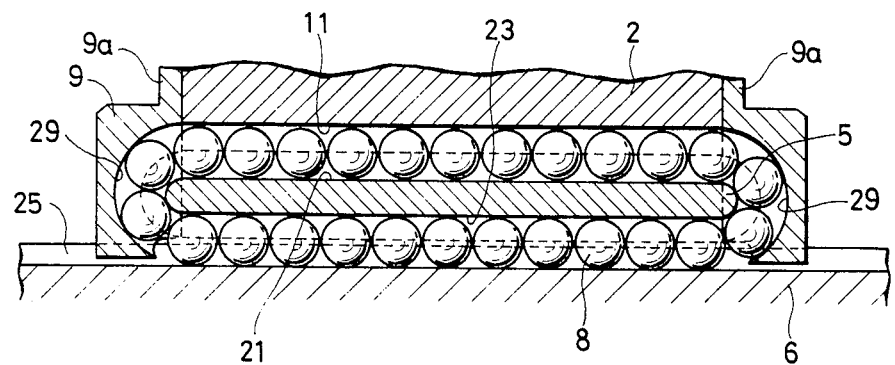
FIG. 10 is a cross-sectional view of what is shown in FIG. 2 along X—X line.

Each of the bearing races 5, 5 is formed of steel fit for qenching with a slender shape corresponding to that of the dovetail recessed grooves 4, 4 of the bearing case 2 in cross section as shown in FIG. 8 and firmly fixed in each of the recessed grooves 4, 4 by it into each of the recessed grooves 4, 4. No-load ball guide grooves 21, 21 are made in surfaces 20, 20 opposite to the bottom walls 10, 10 of the recessed grooves 4, 4 of the bearing case 2 with respect to the bearing races 5, 5. Moreover, load ball grooves 23, 23 are formed in surfaces 22, 22 narrower than those above described and located on the opening sides of the recessed grooves 4, 4. These bearing races 5, 5 are mated with the recessed grooves 4, 4 and firmly fixed therein so as to correct the curve of the bearing case 2 likely to occur because of contraction when the preplaced cores for making the recessed grooves 4, 4 are taken out at the time of molding the bearing case 2. The no-load ball guide grooves 21, 21 on the bearing race 5, 5 sides and the no-load guide grooves 11, 11 on the bearing case 2 side constitute no-load ball guide holes along the bearing case 2 sliding direction as shown in FIG. 10.

Each of the bearing races 5, 5 may be made of stainless steel in case it is needed to be further corrosion resistant or non-magnetic.

The upper portion of the raceway table 6 is mated with the trapezoidal recess formed on the under surface side of the bearing case 2 and rolling grooves 25, 25 for each ball 8 are formed in the positions corresponding to those of ball grooves 23, 23 of the bearing races 5, 5 in the shoulder portion thereof. The depth (t) of the ball grooves 23, 23 and the rolling grooves 25, 25 is set at what is close to the radius of the ball 8, so that the load ball grooves 23, 23 and the rolling grooves 25, 25 can withstand a large radial load as well as a inverse radial load (upward load).

In addition, through holes 27 for inserting set bolts 26 are provided in the raceway table 6 at suitable intervals in the longitudinal direction and the raceway table 6 can be fixed to a bed 28 by screwing the bolts 26 in the through holes 27.

Figure 9:
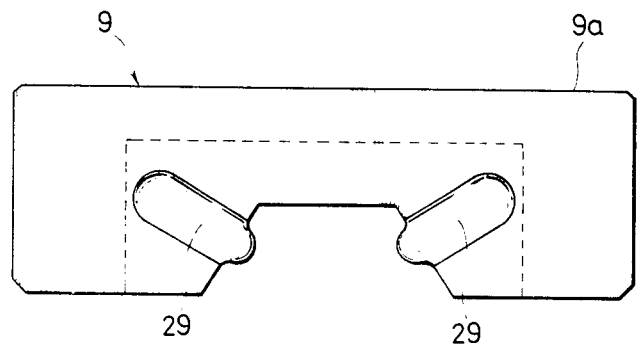
FIG. 9 is a schematic view of a side cover.

The side covers 9, 9 in this embodiment are formed of synthetic resin as in the case of the bearing case and, as shown in FIG. 9, semicircular guide grooves 29, 29 are formed in the inside surfaces in the circumferential direction. These guide grooves 29, 29 are as shown in FIG. 10 welded to the front and rear end surfaces 7, 7 of the bearing case 2 by the plastic welder so as to communicate both the ends of the no-load ball guide grooves 11, 11, and 21, 21, the load ball grooves 23, 23 and the rolling grooves 25, 25 with one another to constitute the endless track for the balls 8. In other words, by utilizing the recesses 15, 15, and escape holes 17, 17 for burying the nuts 14, 14 in the bearing case 2, the thin ribs 9a, 9a of the side covers 9, 9 and the bearing case 2 are arranged between the horn of the plastic welder and the metal cradle. The side covers 9, 9 are installed to the bearing case 2 by heating the portions close to the boundary between the ribs 9a, 9a and the bearing case 2 to form deposits 30, 30.

A plurality of quenched balls 8 normally made of bearing steel are enclosed in the endless track thus constructed so that they are freely rollable. As these balls roll, a load ball train cycle from the load to unload region and an unload ball train cycle from the unload to load region within the endless track, whereby the bearing case 2 and the bearing races 5, 5 are linearly guided along the raceway stand 6.

The ball 8 may be made of stainless steel if it is required to be further corrosion resistant and non-magnetic.

Figure 11:
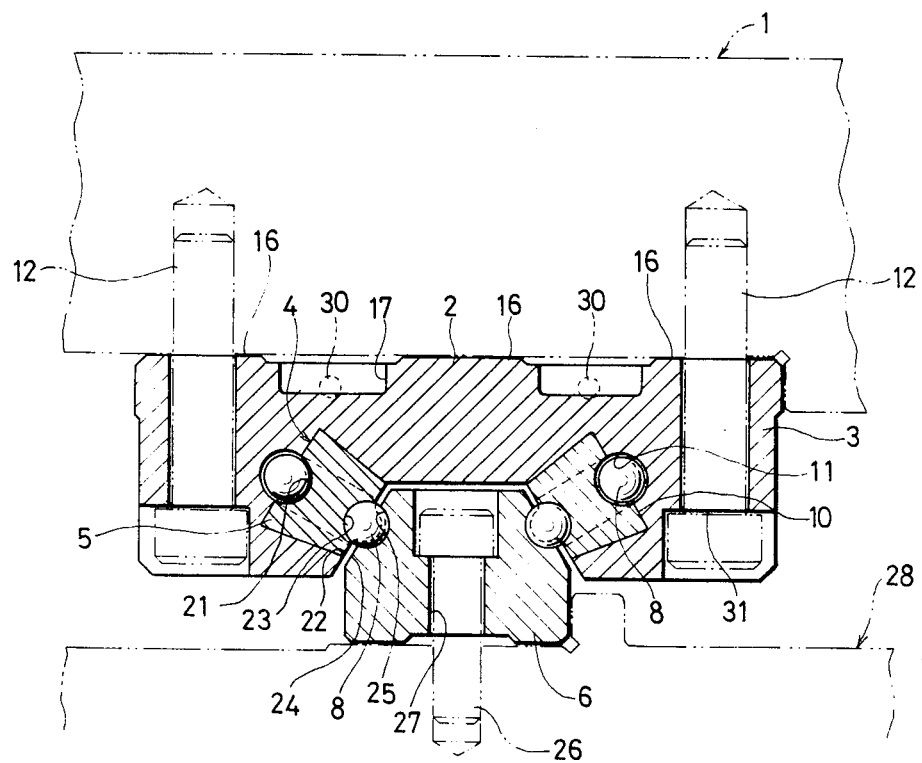
FIG. 11 is a cross-sectional view of a linear slide ball bearing as another embodiment of the present invention.
Figure 12:
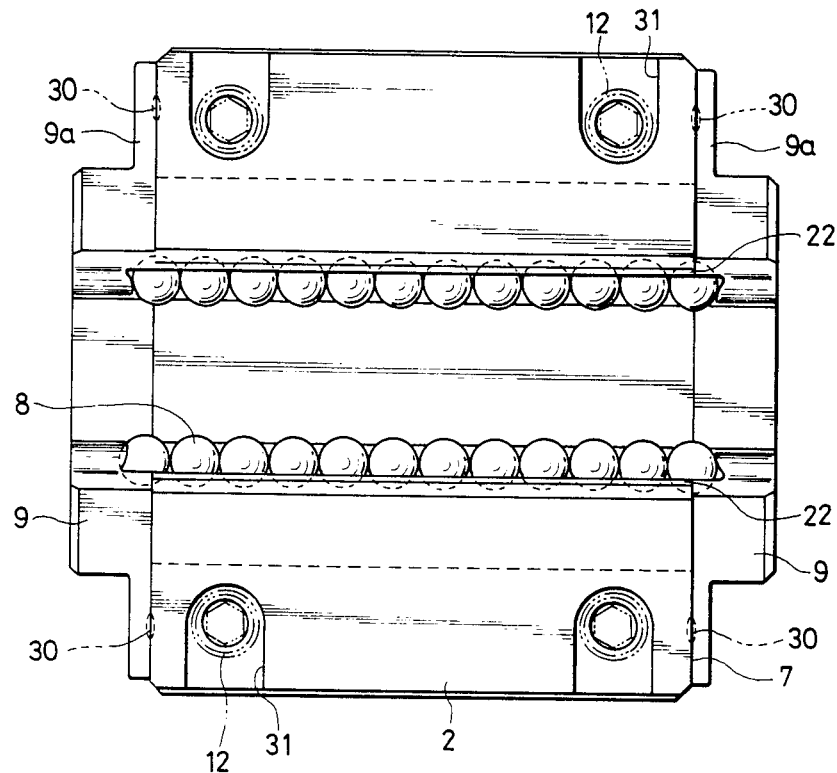
FIG. 12 is a bottom plan view excluding the raceway table.

FIGS. 11 and 12 show another example of the linear slide ball bearing in accordance with the present invention, wherein like characters designate like components employed in the preceding embodiment and description of them is omitted.

In this embodiment, the set bolts 12, 12 for installing the fixing table 1 are screwed from the underside. Recesses 31, 31 for containing the heads of the bolts 12, 12 are made in the under surface of the bearing case 2 and, by inserting the bolts 12, 12 from the underside of the bearing case 2 and screwing them in screw holes of the fixing table 1, the bearing case 2 is combined with the fixing table 1. At the same time, the recesses 31, 31 are utilized for inserting the metal cradle, etc. also in this embodiment when installing the side covers 9, 9 and the bearing case 2.

Although the bearing case 2 as well as the side covers 9, 9 have been arranged that they are made of synthetic resin, they may be prepared by aluminum die casting and other precision molding. In case the bearing case 2 is prepared by aluminum die casting, the aluminum bearing case 2 may directly be processed by tapping without making escape holes 17, 17 in its surface to install the fixing table 1 and each of the side covers 9, 9.

Figures 13, 14:
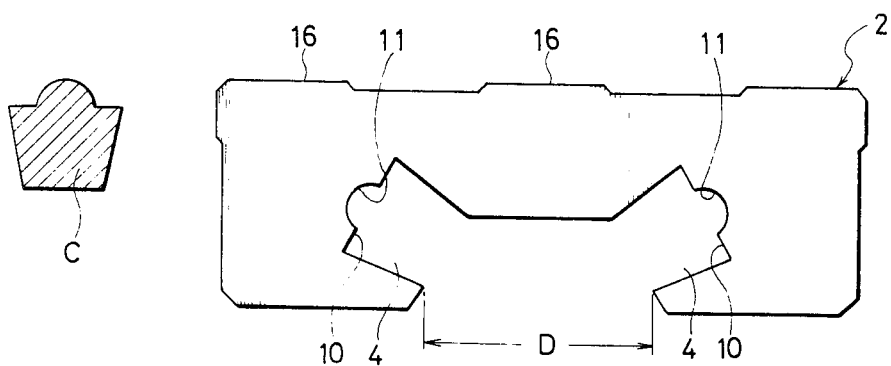
FIG. 13 is a cross-sectional view of a preplaced core used for the production of the linear slide ball bearing in accordance with the present invention.
FIG. 14 is a front view of a bearing case.

FIGS. 13 and 14 illustrate one exemplary embodiment of the method of preparing the linear slide ball bearing in accordance with the present invention, which is applied to the production of the linear slide ball bearing indicated in FIGS. 1 through 12.

In molding the bearing case 2 made of synthetic resin, a preplaced core C having a cross sectional shape corresponding to the that of each of the recesses 4, 4 as shown in FIG. 13 is provided at the position where a metal mold for forming each of the dovetail recesses 4, 4 as the inserts of the bearing case is provided in order to mold the bearing case 2 in this state. It is preferred in this case to make slightly narrow the tapered portion of the preplaced core C. Subsequently, the bearing case 2 is taken out of the metal mold after it has been molded in this manner and the bearing case thus molded is reheated to pull out the preplaced core C, when the bearing case 2 deprived of the preplaced core C slightly contracts, so do the recesses 4, 4 as the openinings for the bearing races 5, 5, causing the width D of the spacing between the tips of the facing recesses 4, 4 shown in FIG. 14 to decrease, whereas a curve is generated on the upper surface of the bearing case 2. If the bearing races 5, 5 shown in FIG. 8 are inserted under pressure in the space produced by taking out the preplaced core C, the bearing races 5, 5 will be fixed solidly in the recesses 4, 4 and simultaneously the curved surface of the bearing case 2 will be straightened.

Thus it is unnecessary to employ screws when the bearing races 5, 5 are fixed and to apply screw tapping to the bearing races 5, 5.

Figure 15:
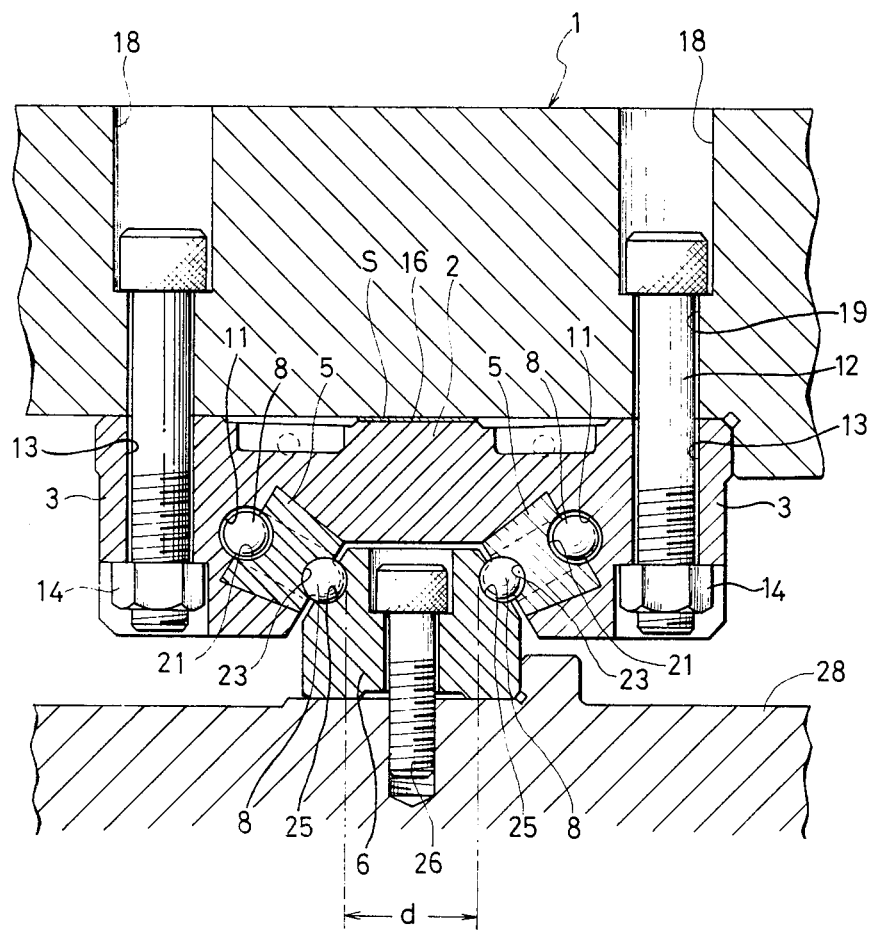
FIG. 15 is a cross-sectional view of a linear slide table incorporating the ball bearing shown in FIGS. 1 through 10.

FIG. 15 shows a linear slide table incorporating the linear slide ball bearing indicated in FIGS. 1 through 10 with an exemplary construction for regulating pressurization.

In FIG. 15, the fixing table 1 is mounted to the bearing case 2 through a shim S as a pressurization adjusting member provided between the upper central tier portion 16 of the bearing case 2 and the fixing table 1, so that the pressurization can be reduced according to the thickness of the shim S. In other words, the pressurization is carried out to a small extent when the bearing assembly on the sides of the bearing case 2 and the bearing races 5, 5 is combined with the raceway table 6 via the ball 8. If the bolts 12, 12 are tightened in such a state that the shim S exists in between when slight sliding is required, the sleeves 3, 3 of the bearing case 2 can be more tightened than the central portion thereof by the thickness of the shim provided therebetween. Accordingly, the width d between the load ball trains in the bearing races 5, 5 is made greater and the pressurization can be reduced in proportion to the thickness of the shim S. As a result, if pressurization is slightly carried out when the bearing assembly and the raceway table 6 are coupled together, the pressurization will be applied to the load ball and this will cause the ball to increase its rigidity and life and allow it to carry out linear guiding smoothly for a long time. When it is desired to employ a linear slide ball bearing for a measuring instrument, that is, when slight sliding is required, the pressurization will readily be regulated so as to reduce it by the presence of the shim. Thus the selection of the thickness of the shim made to lie in between makes it possible to conform the ball bearing to a wide range of operating purposes depending on its use.

To provide slight pressurization, the distance between the facing load ball grooves 23, 23 in the bearing races 5, 5 can be so arranged that it is set rather small in anticipation of the application of the pressurization or otherwise the width between the rolling grooves 25, 25 in the raceway table 6 can be arranged rather great, so that pressurization is applicable by allowing the load to be given to the ball 8 when the grooves is combined with the raceway table 6.

FIGS. 16, 17 and 18 through 22 show other exemplary embodiments so constructed as to regulate the pressurization, wherein the bearing case of the linear slide ball bearing is molded by aluminum die casting.

Figure 16:
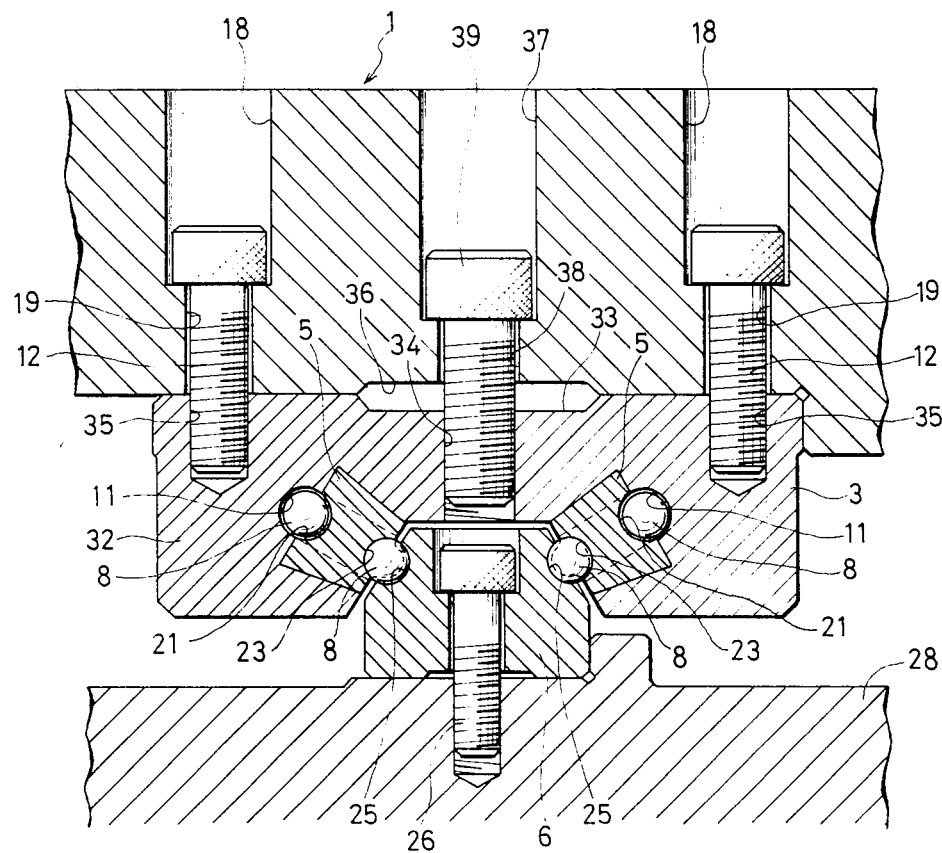
FIG. 16 is a cross-sectional view of a linear slide table as another embodiment of the present invention.

In the case of a construction shown in FIG. 16, a bearing case 32 molded by aluminum die casting is provided with a recess 33 formed in the upper central portion of the bearing case 32 and a screw hole 34 formed in the recess 33. In addition, screw holes 35, 35 are made in both end portions in the surface of the bearing case 32 and the fixing table 1 is installed to the bearing case 32 by screwing the bolts 12 12 in the holes 35, 35. On the other hand, there is formed a recess 36 opposite to the recess 33 in the surface of the bearing case in the under surface of the fixing table 1 and a through hole 37 with a slightly large diameter and another 38 with a small diameter are formed at the position where is the recess 36 is located. A bolt 39 as a pressurization regulating member is screwed in a screw hole 34 made in the bearing case 32 via through holes 37, 38 in the fixing table 1 between the bearing case 32 and the fixing table 1.

With this construction, if the bolt 39 is tightened, the central portion of the bearing case 32 will be raised toward the fixing table 1, causing the width between the load ball trains in the bearing races 5, 5 to be shortened. Consequently, the pressurization will be increased according to the degree of tightening the bolt 39, whereas, if the bolt 39 is adjusted to loosen it, the pressurization will be reduced. Thus the pressurization can be regulated as occasion demands and in addition the pressurization is readily regulated from the upper side of the fixing table 1 while the fixing table 1 is being installed.

Figure 17:
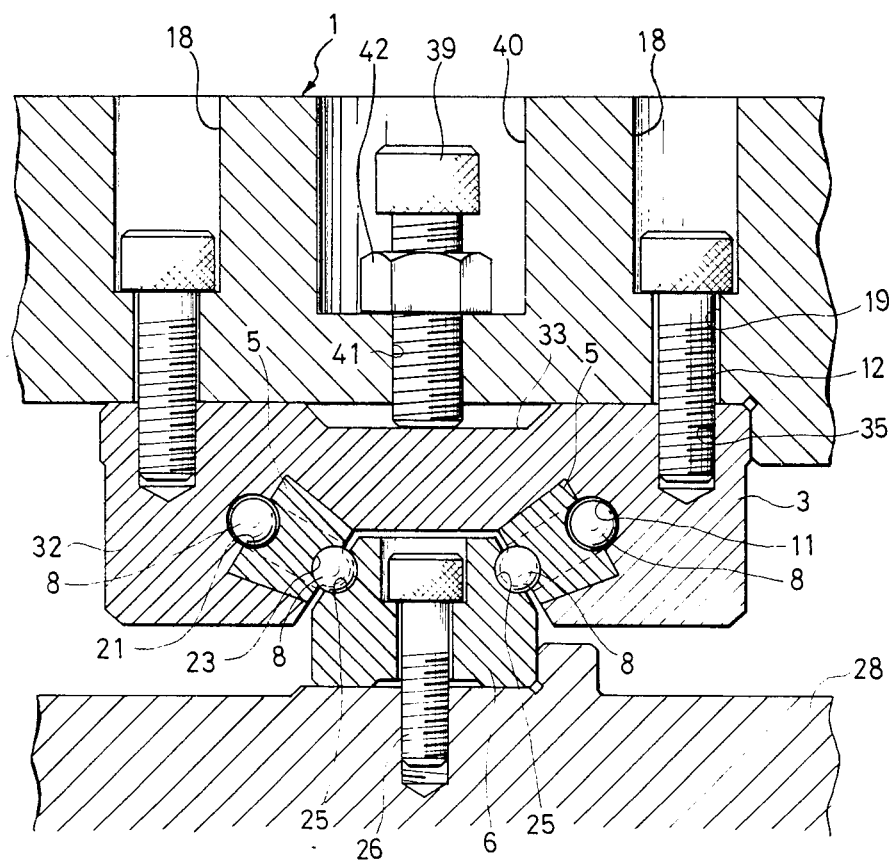
FIG. 17 is a cross-sectional view of a linear slide table as still another embodiment of the present invention.
Figure 18:
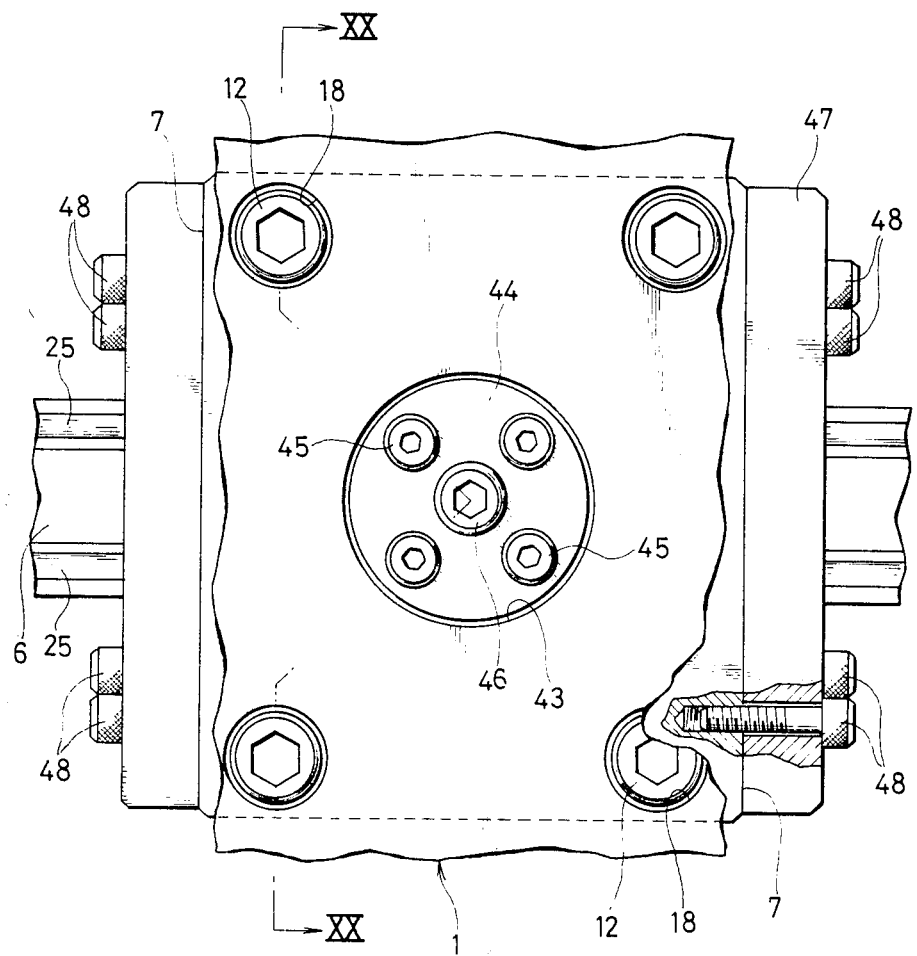
FIG. 18 is a plan view of the linear slide table shown in FIG. 17.
Figure 19:
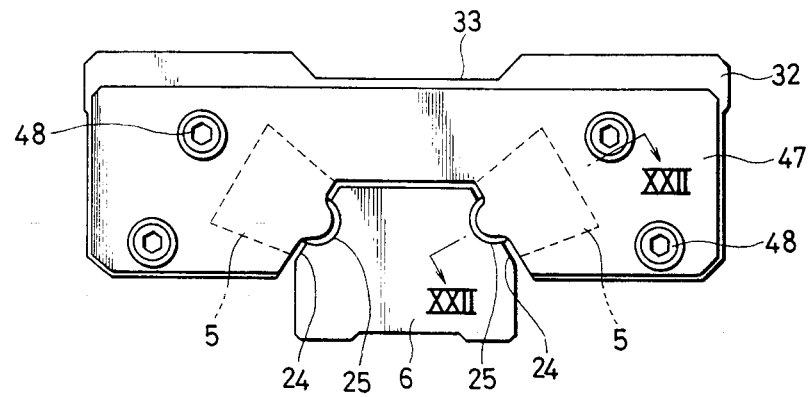
FIG. 19 is a front view of the linear slide ball bearing shown in FIG. 18.
Figure 20:
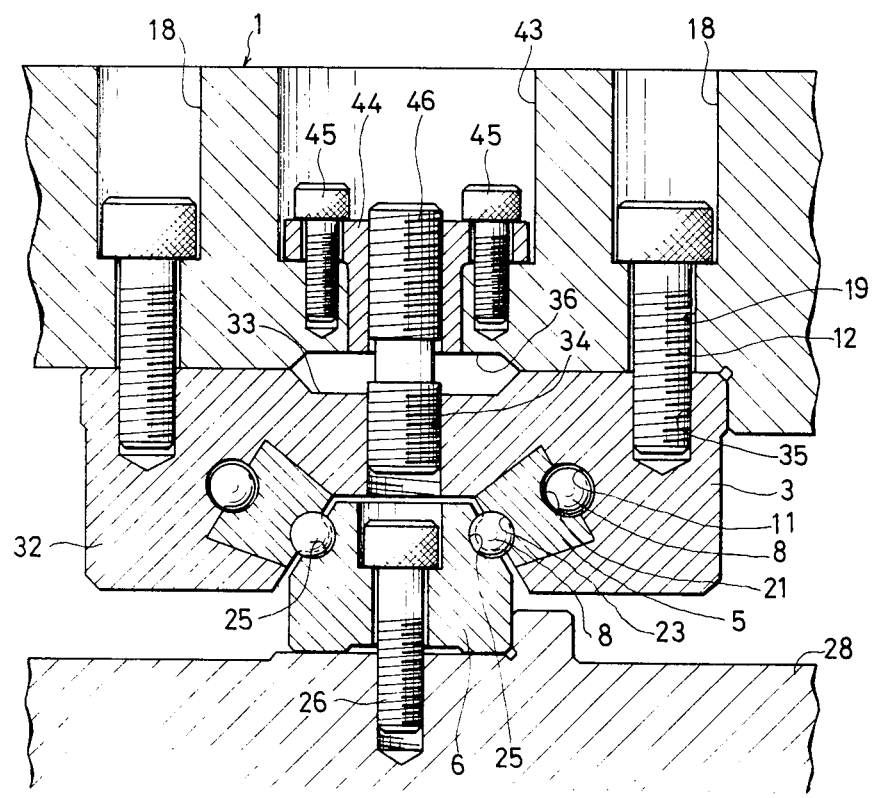
FIG. 20 is a cross-sectional view of what is shown in FIG. 18 along XX—XX line.
Figure 21:
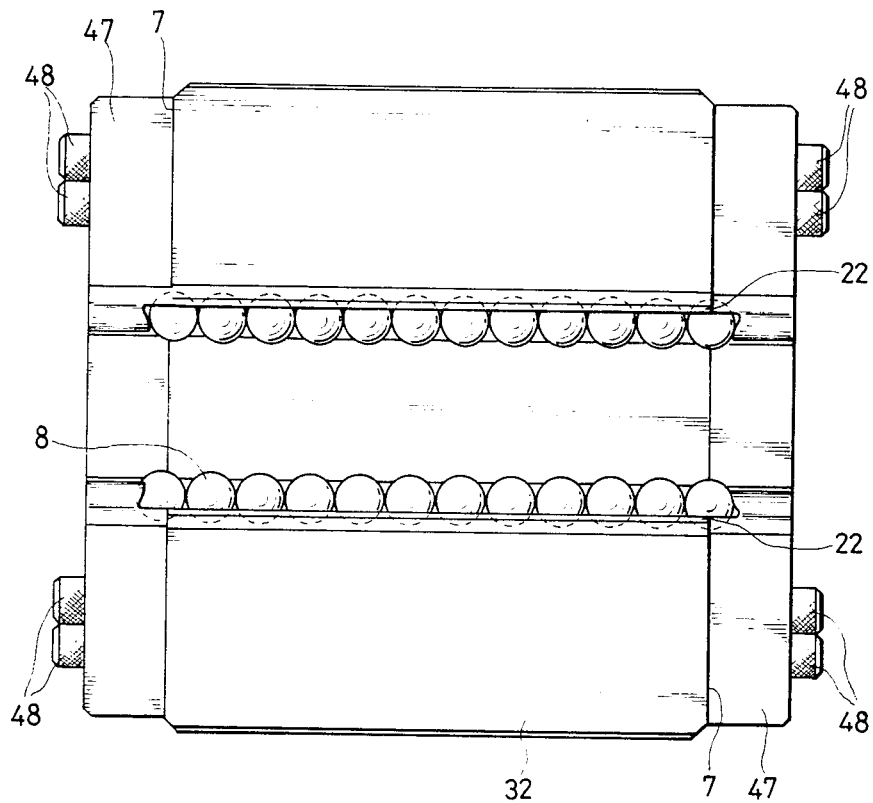
FIG. 21 is a bottom view excluding the raceway table.
Figure 22:
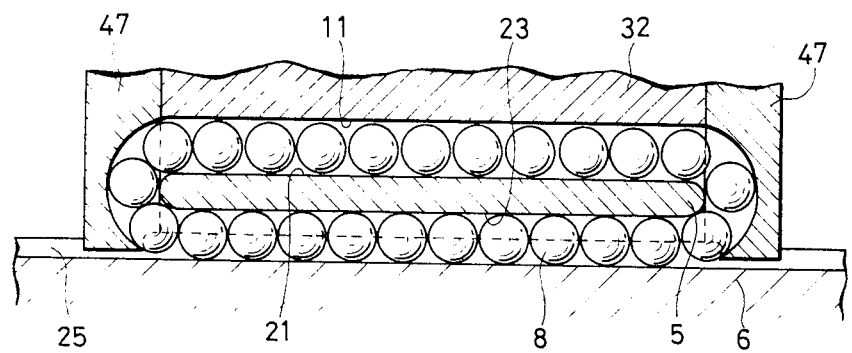
FIG. 22 is a cross-sectional view of what is shown in FIG. 19 along XXII—XXII line.

FIG. 17 illustrates another construction with a recess 40 formed in the surface of the fixing table 1 and a screw hole 41 made in the recess 40. The bolt 39 as the pressurization regulating member is screwed in the hole 41, allowing the front end of the bolt 39 to contact the bottom of the recess 33 on the surface of the bearing case 32, and the bolt 39 is locked by a locknut 42.

With this construction, if the bolt 39 is tightened, the central portion of the bearing case 32 will be pushed down so that the width between the load ball trains in the bearing races 5, 5 becomes greater, causing the pressurization to be reduced. Accordingly, pressurization can be thus regulated depending on the use, for instance, when slight sliding is required. Moreover, it is unnecessary in this case to prepare a screw hole for screwing the bolt 39 in the bearing case 32 and, because the bolt 39 is locked by the locknut 42, the bolt 39 is unlikely to be loosened unexpectedly during linear sliding operation, so that the ball bearing can be made to carry out linear sliding while the set pressurization is always maintained at the time of sliding.

In the case of the construction shown in FIGS. 18 through 22, a hole 43 with a tier portion is made in the fixing table 1 in the halfway from the upper surface to the recess 36 in the under surface and a nut 44 with ribs is inserted in the hole 43 and fixed to the tier portion with bolts 45, 45. There is provided a difference in pitch between the female screw of the the nut 44 with ribs and the screw hole 34 corresponding the the bearing case 32 and a bolt 46 with a difference in pitch between the nut 44 with ribs and the male screw engaged with the screw hole 34 is provided as a pressurization regulating member. Side covers 47, 47 are installed to the bearing case 32 prepared by aluminum die casting with bolts 48, 48.

With the above construction, fine adjustment is possible because the bolt 46 is provided with the difference in pitch and suitable pressurization, when it is to be regulated, can be selected by turning the bolts 46.

As exemplified above, for prolonging the life of the slide ball bearing by regulating pressurization to supply rigidity and on the contrary for lightly sliding the bearing as the bearing is used for a measuring instrument, use can be made of various purposes. For instance, as shown in FIG. 23, when the ball bearings B1, B2 are used in two parallel rows and the parallelism is slightly imbalanced, the ball bearing can be used by absorbing such imbalanced parallelism by giving pressurization to one of the ball bearings B1 to make it a reference axis for the raceway table 6, setting the other bearing B2 provided with the fixing table 1 common to the above ball bearing B1 as an auxiliary side, and reducing the pressurization of the latter B2 to widen the width d between the load ball trains in the bearing races 5, 5 and to provide a slight gap.

As noted above, since the bearing race in the linear slide ball bearing in accordance with the present invention is fixed by providing the recessed groove with its width being gradually decreased toward its opening in cross section in both the sleeves of the bearing case and mounting the bearing race in the recessed groove to utilize the transformation of the bearing case because of heat contraction, the pair of bearing races are readily installed and they can be firmly fixed without using screws. In addition, as it is unnecessary to provide screw tapping for the installation of the bearing race, processing can readily be carried out and, when the load ball groove is quenched, the bearing race is not liable to cracks because of the presence of the screw hole at the time of quenching. Furthermore, because it is so arranged that the formation of the no-load ball hole is formed when the bearing race is fixed by the no-load ball guide groove formed in the bearing race and no-load ball guide groove formed in the bearing case, troublesome operation of preparing the through hole as the no-load ball guide hole to be made in the bearing race itself is not required and consequently processing is readily carried out because the formation of the roughly semicircle ball guide groove is only necessary on the surface of the bearing race.

Moreover, because it is so arranged that the bearing race is fixed to the bearing case, each of them can be made of different materials. It is possible to made only the bearing race of quenchable material and quench the material before machining it. If corrosion resistance is required, only the bearing race can be made of stainless steel. On the other hand, the bearing case will not interfere the selection of material required for the bearing race, which can be made of synthetic resin and by aluminum die casting; consequently it can be made light in weight and require no lubrication ability. Reduction in weight decreases inertia and minimizes the time required until the target speed is attained by improving the rise-up speed. No lubrication may facilitate the maintenance and, if corrosion resistance is required on the bearing case side, it may be made of synthetic resin. Consequently, the generation of rust can be prevented without impairing the compactness and non-lubricating ability.

If the bearing case is so constructed that through holes are made to install the fixing table by inserting bolts in the holes without screw tapping, the fixing table will be fixed firmly even when the fixing table can not be installed to the bearing case by directly making screw holes therein because the bearing case made of synthetic resin is not strong enough to bear the perforation. Moreover, the through hole can be made simultaneously when the bearing case is molded.

If the bearing case and side covers are made of synthetic resin and welded together by the plastic welder, the side covers will be readily installed. When they are welded together by the plastic welder, the welding operation can be carried out by insetting the metal cradle in the recess for containing the nuts formed in the under surface of the bearing case; in other words, the recess can effectively be utilized even when the side covers are installed.

Furthermore, the method of manufacturing the linear slide ball bearing in accordance with the present invention allows each recessed groove to be made in the bearing case simply by taking out the preplaced core after molding the bearing case using synthetic resin and the preplaced core, and is capable of firmly fixing the bearing case by utilizing heat contraction and elasticity at the time of molding the synthetic resin and inserting the bearing race in the recessed groove under pressure, whereby the linear slide ball bearing having the above described advantages can be manufactured less costly.

Moreover, since the linear slide table incorporating the above linear slide ball bearing is so arranged that the fixing table is mounted on the surface of the bearing case with bolts and that the pressurization is regulated by providing the pressurization regulating member between the fixing table and the bearing case, the regulation of the pressurization can readily be made in between the bearing case and the fixing table. As it is also possible that the center of the bearing case and the position of the fixing table are not likely to be out of order against the raceway table while the pressurization is regulated, the regulation of the pressurization will not affect the widthwise positioning of them. Accordingly, the linear slide ball bearing thus constructed is suitable for wide use ranging from making it capable of conducting linear guide operation smoothly for a long time by providing the load ball with rigidity by applying pressurization thereto up to providing the light sliding required for a measuring instrument and to permiting the use of the bearings in two parallel rows, though the parallelism is imbalanced.

What is claimed is:

1. A method for manufacturing a linear slide ball bearing comprising the steps, at the time of incorporating a bearing case with a pair of bearing races, a raceway table, a pair of side covers and a number of balls, molding the bearing case and the pair of side covers in synthetic resin, forming recessed grooves by taking out the preplaced core arranged in both the sleeves at the time of molding the bearing case, inserting under pressure the bearing races formed almost the same as the preplaced cores in the recessed grooves, fixing the bearing races in the sleeves of the bearing case while correcting the curve of the bearing case generated by the contraction of the recessed groove when the preplaced core is taken out, and installing the pair of side covers to both the sides of the bearing case subsequently.

2. A method for manufacturing a linear ball bearing as claimed in claim 1, wherein a pair of side covers are welded to both the sides of the bearing case by a plastic welder.

* * * * *

UNITED STATES PATENT AND TRADEMARK OFFICE
CERTIFICATE OF CORRECTION

PATENT NO. : 4,551,895
DATED : November 12, 1985
INVENTOR(S) : HIROSHI TERAMACHI It is certified that error appears in the above-identified patent and that said Letters Patent is hereby corrected as shown below:

On the cover page, after Item [22] insert ---

[30]  Foreign Application Priority Data

October 25, 1982  Japan............... 57-186146

October 25, 1982  Japan............... 57-186147 ---.

Signed and Sealed this

Third Day of June 1986

[SEAL]

Attest:

DONALD J. QUIGG

Attesting Officer

Commissioner of Patents and Trademarks